United States Patent
Koh (10) Patent No.: US 11,858,452 B2
(45) Date of Patent: Jan. 2, 2024

(54) AIR BAG CUSHION FOR VEHICLE

(71) Applicant: HYUNDAI MOBIS CO., LTD., Seoul (KR)

(72) Inventor: Min Seok Koh, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/929,249

(22) Filed: Sep. 1, 2022

(65) Prior Publication Data
US 2023/0077752 A1 Mar. 16, 2023

(30) Foreign Application Priority Data
Sep. 14, 2021 (KR) .................. 10-2021-0122624

(51) Int. Cl.
| | | |
|---|---|---|
| *B60R 21/2338* | (2011.01) | |
| *B60R 21/205* | (2011.01) | |
| *B60R 21/233* | (2006.01) | |
| *B60R 21/231* | (2011.01) | |
| *B60R 21/237* | (2006.01) | |

(Continued)

(52) U.S. Cl.
CPC ........ *B60R 21/2338* (2013.01); *B60R 21/205* (2013.01); *B60R 21/231* (2013.01); *B60R 21/233* (2013.01); *B60R 21/237* (2013.01); *B60R 21/2342* (2013.01); *B60R 2021/23308* (2013.01); *B60R 2021/23324* (2013.01); *B60R 2021/23382* (2013.01); *B60R 2021/23576* (2013.01)

(58) Field of Classification Search
CPC . B60R 21/2338; B60R 21/205; B60R 21/233; B60R 21/231; B60R 21/239; B60R 21/237; B60R 21/2342; B60R 2021/23382; B60R 2021/23308; B60R 2021/23316; B60R 2021/23324; B60R 2021/0009; B60R 2021/0048; B60R 2021/0004; B60R 2021/23576; B60R 2021/23538; B60R 2021/0023; B60R 2021/23509
USPC ................ 280/743.2, 729, 730.1, 732, 743.1
See application file for complete search history.

(56) References Cited

U.S. PATENT DOCUMENTS

| | | | |
|---|---|---|---|
| 2007/0045997 A1* | 3/2007 | Abe ...................... | B60R 21/231 280/739 |
| 2017/0028956 A1* | 2/2017 | Ohno .................... | B60R 21/231 |
| 2017/0101071 A1* | 4/2017 | Kruse ................. | B60R 21/2338 |

FOREIGN PATENT DOCUMENTS

| | | |
|---|---|---|
| JP | 2018075970 A * | 5/2018 |
| JP | 2019038399 A * | 3/2019 |

(Continued)

OTHER PUBLICATIONS

English Language Abstract of KR 2005-0021184 published Mar. 7, 2005.

*Primary Examiner* — Keith J Frisby
(74) *Attorney, Agent, or Firm* — DLA PIPER LLP (US)

(57) ABSTRACT

An air bag cushion for a vehicle. A tether reinforcing fabric coupled to a tether seam portion of a main cushion is used to allow the tether reinforcing fabric to inflate with the main cushion when the main cushion inflates, and the inflating tether reinforcing fabric forms an auxiliary chamber between the main cushion and the tether reinforcing fabric, and the auxiliary chamber of the tether reinforcing fabric supports the head of a passenger in a front passenger seat in the event of a crash, thereby preventing the rotation of the passenger's head and efficiently protecting the safety of the front passenger.

10 Claims, 5 Drawing Sheets

(51) Int. Cl.
  *B60R 21/2342*  (2011.01)
  *B60R 21/235*   (2006.01)

(56) References Cited

FOREIGN PATENT DOCUMENTS

KR   2005-0021184        3/2005
KR    20180066409 A  *   6/2018

* cited by examiner

AIR BAG CUSHION FOR VEHICLE

CROSS REFERENCE TO RELATED APPLICATION

The present application claims priority to Korean Patent Application No. 10-2021-0122624, filed on Sep. 14, 2021, the entire contents of which is incorporated herein for all purposes by this reference.

BACKGROUND OF THE INVENTION

Field of the Invention

The present invention relates to an air bag cushion for a vehicle and, more particularly, to an air bag cushion for a vehicle, the air bag cushion being capable of efficiently protecting the safety of a passenger in a front passenger seat in the event of a new frontal offset crash.

Description of the Related Art

In general, vehicles are equipped with various types of air bag devices to protect passengers in the event of an accident. Among the air bag devices, an air bag device for a front passenger seat is mounted to be embedded inside a crush pad and an air bag cushion thereof is unfolded toward a front passenger in a front passenger seat in a crash to protect the front passenger.

Meanwhile, in order to secure overseas sales networks, automakers are developing and selling vehicles that meet the small overlap crash test hosted by the Insurance Institute for Highway Safety (IIHS).

The small overlap crash test of IIHS is conducted under conditions of a vehicle speed of 64 km/h, an angle of 0 degree front, an offset amount of 25%, and a barrier of a rigid column. In the future, vehicles should satisfy the new frontal research moving deformable barrier test, which further considers the safety of passengers.

The new frontal research moving deformable barrier test is a test conducted under conditions of a vehicle speed of 90.1 km/h, an angle of 15, an offset amount of 35%, and research moving deformable barrier (RMDB). Compared to the small overlap crash test, a vehicle speed and a barrier weight are more severe in the new frontal research moving deformable barrier test, and for this reason, a method to ensure the safety of vehicle passengers, especially the front passenger, is emerging as an urgent task.

In other words, in the event of a new frontal offset crash, the upper body of the front passenger is twisted in a direction in which the offset crash occurred (driver's seat direction), and a moving amount of the front passenger toward the front side of the vehicle is further increased. Specifically, when the head of the front passenger is brought into contact with the unfolded air bag cushion, excessive rotation of the front passenger's head may result in greater head injury.

Therefore, in order to efficiently protect the front passenger, a technology to prevent the rotation of the passenger's head by the unfolded air bag cushion is required.

The foregoing is intended merely to aid in the understanding of the background of the present invention, and is not intended to mean that the present invention falls within the purview of the related art that is already known to those skilled in the art.

SUMMARY OF THE INVENTION

The present invention is intended to provide an air bag cushion for a vehicle, wherein the air bag cushion is capable of efficiently protecting the safety of a front passenger in a front passenger seat with an additional auxiliary chamber formed using a tether reinforcing fabric provided to maintain a tension of a tether, when the air bag cushion of a front passenger seat is unfolded, the auxiliary chamber preventing the front passenger's head rotation.

In order to achieve the above objective, according to one aspect of the present invention, there is provided an air bag cushion for a vehicle, the air bag cushion including: a main cushion configured to inflate by a pressure of air bag gas generated when an inflator is operated and to be unfolded toward a passenger in a front passenger seat; and a tether reinforcing fabric coupled to the main cushion so as to reinforce a tether seam portion of the main cushion, configured to inflate together with the main cushion by receiving the air bag gas from the main cushion when the main cushion inflates, and configured to provide an auxiliary chamber configured to prevent the rotation of the front passenger's head when being brought into contact with the passenger's head after inflating.

The tether reinforcing fabric may be coupled to a front surface of the main cushion, the front surface facing the passenger in the front passenger seat, and be configured to be unfolded toward the passenger in the front passenger seat while inflating.

The main cushion may have a double panel structure including: a front cushion part configured to face the passenger in the front passenger seat while inflating; and a rear cushion part connected to the front cushion part, extended toward a front portion of the vehicle, and coupled to the inflator.

The double panel structure of the main cushion may be formed by sewing an upper edge line of the front cushion part and an upper edge line of the rear cushion part to each other, and by sewing a lower edge line of the front cushion part and a lower edge line of the rear cushion part to each other, and by sewing a left-upper edge line and a left-lower edge line of the rear cushion part to each other, and by sewing a right-upper edge line and a right-lower edge line of the rear cushion part.

The front cushion part and the rear cushion part may be connected to each other along a curvature line.

The air bag cushion may include a tether of which a first end may be sewn on the tether seam portion of the front cushion part and a second end may be sewn on the rear cushion part, and configured to maintain an inflation state of a main chamber by a tension when the main cushion inflates.

The front cushion part may include the tether seam portion on which a first end of a tether may be sewn; and the tether reinforcing fabric may be coupled to a front surface of the front cushion part, the front surface facing the passenger in the front passenger seat, while including the tether seam portion.

A front surface of the front cushion part may have a plurality of vent holes configured to transfer the air bag gas to the auxiliary chamber.

An edge line of the tether reinforcing fabric and an edge line of a front surface of the front cushion part may be sewn to each other; and before the tether reinforcing fabric inflates, the tether reinforcing fabric may remain in a folded state in which the tether reinforcing fabric may be brought into close contact with a front surface of the front cushion part and is folded several times.

The air bag cushion may include a first coupling portion simultaneously sewing the front cushion part to the folded tether reinforcing fabric to maintain the tether reinforcing fabric in the folded state, wherein the first coupling portion may be broken by an inflation pressure of the tether reinforcing fabric when the folded tether reinforcing fabric inflates by the pressure of the air bag gas.

The tether reinforcing fabric may be configured to inflate by receiving the pressure of the air bag gas from the folded state, and after inflation, the auxiliary chamber may be provided between the front cushion part and the tether reinforcing fabric.

The auxiliary chamber may include a first auxiliary chamber and a second auxiliary chamber formed symmetrically left and right, and a second coupling portion may be provided to simultaneously sew the front cushion part and the tether reinforcing fabric so as to maintain the forms of the first auxiliary chamber and the second auxiliary chamber, wherein the second coupling portion continuously may maintain the coupled state between the front cushion part and the tether reinforcing fabric without being broken when the tether reinforcing fabric inflates.

In the air bag cushion for a vehicle according to the present invention, the tether reinforcing fabric coupled to the tether seam portion of the main cushion is used to allow the tether reinforcing fabric to inflate together with the main cushion when the main cushion inflates, and the auxiliary chamber is formed between the main cushion and the tether reinforcing fabric by the inflating tether reinforcing fabric, and the front passenger's head is supported by the auxiliary chamber of the tether reinforcing fabric in the event of a crash to prevent the movement of the front passenger's head. Therefore, even in the event of a new frontal offset crash, the safety of the front passenger in the front passenger seat can be efficiently protected.

Furthermore, the air bag cushion for a vehicle according to the present invention includes the auxiliary chamber formed when the tether reinforcing fabric is unfolded and the auxiliary chamber consists of the first auxiliary chamber and the second auxiliary chamber, which are formed symmetrically left and right, so that when the front passenger's head is brought into contact with the auxiliary chamber in the event of a crash, the first auxiliary chamber and the second auxiliary chamber support the front passenger's head at the left and right of the head. Therefore, the front passenger's head can be efficiently prevented from rotating, and even in the event of a frontal offset crash, the front passenger can be safely protected.

DETAILED DESCRIPTION OF THE INVENTION

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

The terminology used herein is for the purpose of describing particular embodiments only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

According to the exemplary embodiment of the present invention, a controller may be realized by a nonvolatile memory (not shown), which consists of an algorithm configured to control operations of various components of a vehicle or data regarding software instructions to play the algorithm, and a processor (not shown), which is configured to perform operations described below using the data stored in the memory. The memory and processor may be realized as separate chips. Alternately, the memory and processor may be realized as an integrated single chip. The processor may have one or more forms.

Hereinbelow, the air bag cushion for a vehicle according to an exemplary embodiment of the present invention will be described with reference to accompanying drawings.

An air bag cushion 1 according to the present invention is an air bag cushion constituting an air bag apparatus for a front passenger seat. As shown in FIGS. 1 to 5, the air bag cushion includes: a main cushion 100 inflating by pressure of air bag gas generated when an inflator 101 is operated and unfolded toward a front passenger in the front passenger seat; and a tether reinforcing fabric 200 coupled to the main cushion 100 to reinforce a tether seam portion 110 of the main cushion 100, and configured to inflate with the main cushion by receiving the air bag gas from the main cushion 100 when the main cushion 100 inflates, and providing an auxiliary chamber 210 configured to be brought into contact with the head of the front passenger in the front passenger seat after inflating and prevent the rotation of the front passenger's head.

Furthermore, the air bag cushion 1 according to the present invention includes: a tether 300 of which a first end is sewn on the tether seam portion 110 of the main cushion 100 and a second end is sewn on the main cushion 100 at a front portion of the vehicle and maintaining an inflation state of a main chamber 140 by a tension when the main cushion 100 inflates.

When the main cushion 100 inflates by the air bag gas and is unfolded, the tension by the tether 300 is applied to the tether seam portion 110 of the main cushion 100 and the durability of the tether seam portion 110 is deteriorated. In order to reinforce the deteriorated portion, the tether reinforcing fabric 200 is coupled to the tether seam portion 110 of the main cushion 100.

According to the embodiment of the present invention, the tether reinforcing fabric 200 coupled to the tether seam portion 110 is used to allow the tether reinforcing fabric 200 to inflate with the main cushion when the main cushion 100 inflates, and the auxiliary chamber 210 is provided between the main cushion 100 and the tether reinforcing fabric 200. In the event of a crash, the auxiliary chamber 210 of the tether reinforcing fabric 200 is used to support the head of the front passenger and to prevent the rotation of the front passenger's head, so that the safety of the front passenger can be efficiently protected even in the event of a frontal offset crash.

According to the present invention, the tether reinforcing fabric 200 is coupled to a front surface of the main cushion 100, the front surface facing the front passenger, and receives the air bag gas when the main cushion 100 is unfolded and inflates together with the main cushion to be unfolded, and an unfolded direction when inflating is a direction toward the front passenger.

According to the present invention, the main cushion 100 has a double panel structure consisting of a front cushion part 120 facing the front passenger when inflating, and a rear cushion part 130 connected to the front cushion part 120, extended toward the front portion of the vehicle, and coupled to the inflator.

Figure 5:
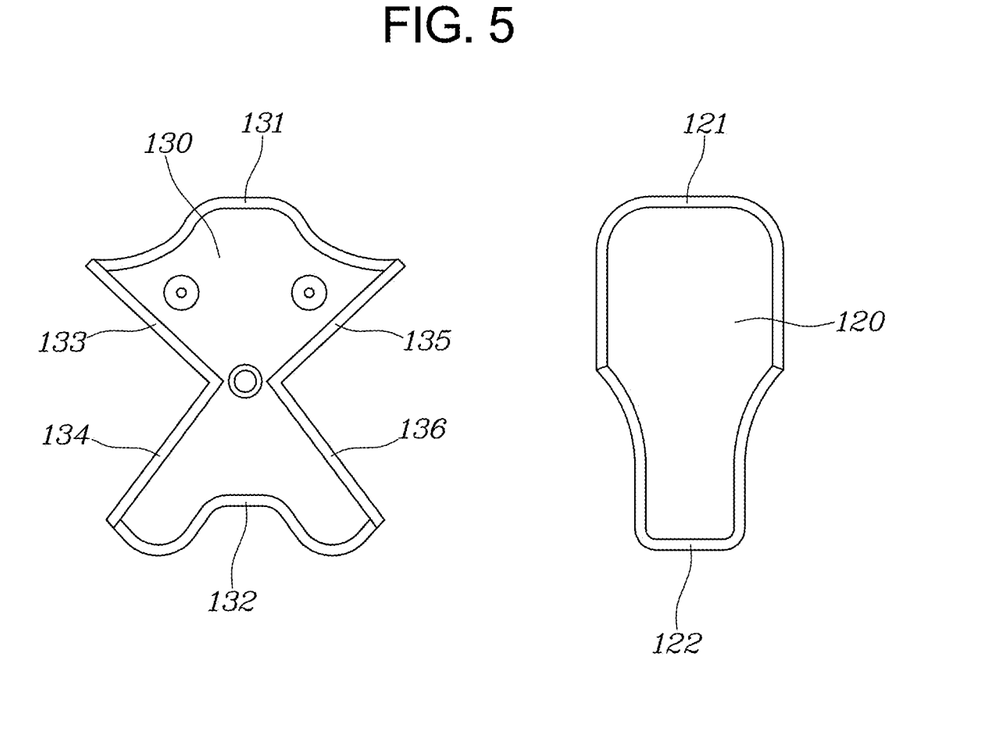
FIG. 5 is a disassembled view showing the main cushion having a double panel structure consisting of a front cushion part and a rear cushion part according to the present invention.

In other words, as shown in FIG. 5, the main cushion 100 having the double panel structure is formed such that an upper edge line 121 of the front cushion part 120 and an upper edge line 131 of the rear cushion part 130 are sewn to each other, and a lower edge line 122 of the front cushion part 120 and a lower edge line 132 of the rear cushion part 130 are sewn to each other, and a left-upper edge line 133 and a left-lower edge line 134 of the rear cushion part 130 are sewn to each other and a right-upper edge line 135 and a right-lower edge line 136 of the rear cushion part 130 are sewn to each other.

The front cushion part 120 and the rear cushion part 130 are sewn to each other, and when the main cushion 100 is unfolded, an inside space between the front cushion part 120 and the rear cushion part 130 becomes the main chamber 140 supporting and protecting the upper body of the front passenger.

The front cushion part 120 and the rear cushion part 130 constituting the double panel structure of the main cushion 100 are connected to each other along a curvature line 150, so that there is an advantage in which a profile same as the structure of a cushion with a chamber using a three-panels structure may be reproduced.

According to the present invention, a first end of the tether 300 is sewn on the tether seam portion 110 of the front cushion part 120 and a second end thereof is sewn on the rear cushion part 130, so that the inflation state of the main chamber 140 is maintained by the tension of the tether 300 when the main cushion 100 inflates.

The tether seam portion 110 on which the first end of the tether 300 is sewn is provided in the front cushion part 120 of the main cushion 100, and the tether reinforcing fabric 200 is coupled to a front surface of the front cushion part 120, the front surface facing the front passenger, while including the tether seam portion 110.

The tether reinforcing fabric 200 is preferably made of fabric and textile material, but is not limited thereto.

The front surface of the front cushion part 120 has a plurality of vent holes 160 to transfer the air bag gas to the auxiliary chamber 210.

The air bag cushion of the present invention is configured such that the inflator is coupled to the rear cushion part 130 of the main cushion 100 and the air bag gas is generated when the inflator is operated to allow the main cushion 100 to inflate and be unfolded, the air bag gas in the main cushion 100 is transferred to the auxiliary chamber 210 through the plurality of vent holes 160, and the air bag gas flowing into the auxiliary chamber 210 allows the tether reinforcing fabric 200 to inflate and be unfolded.

Figure 4:
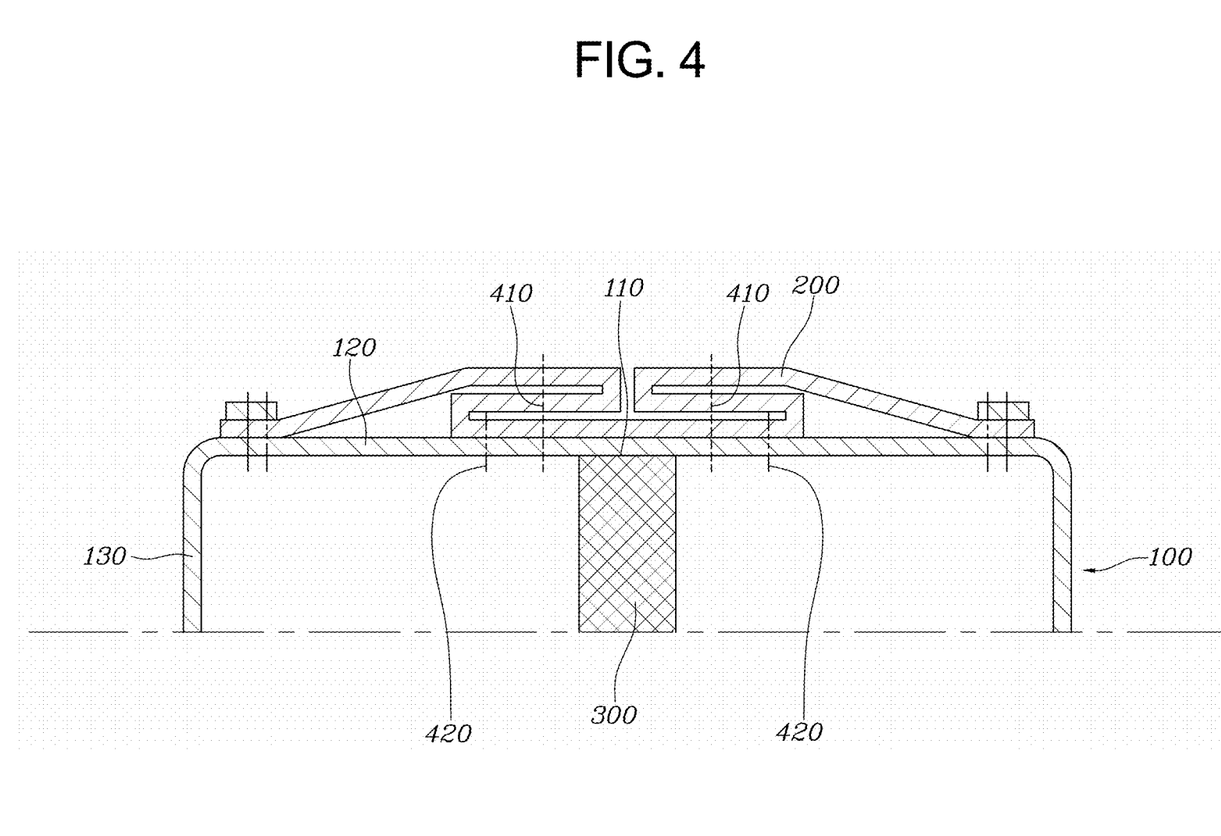
FIG. 4 is a view showing the folded tether reinforcing fabric before being unfolded, the tether reinforcing fabric forming the main cushion and the auxiliary chamber.

According to the present invention, an edge line of the tether reinforcing fabric 200 is sewn on an edge line of the front surface of the front cushion part 120. As shown in FIG. 4, before the tether reinforcing fabric 200 inflates, the tether reinforcing fabric 200 is in close contact with the front surface of the front cushion part 120 and is maintained in a state of being folded several times.

Figure 1:
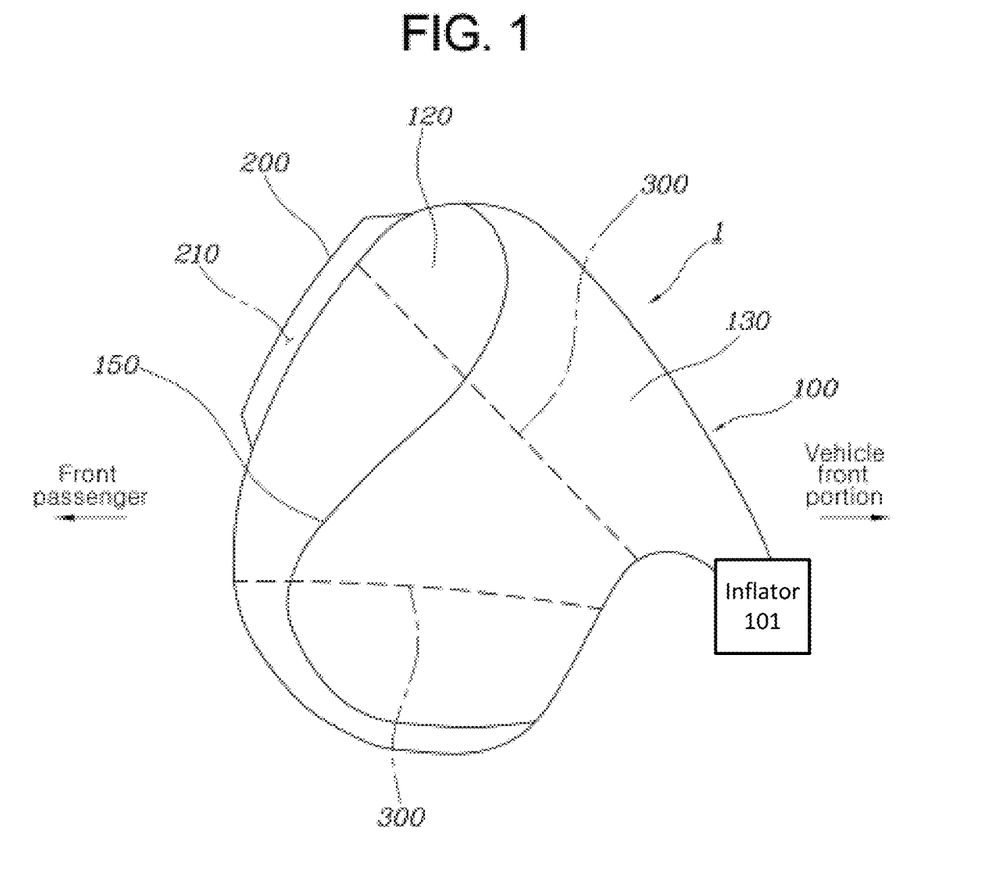
FIG. 1 is a view showing an air bag cushion of a front passenger seat according to the present invention, wherein a tether reinforcing fabric forming a main cushion and an auxiliary chamber is in an inflating and unfolded state.
Figure 2:
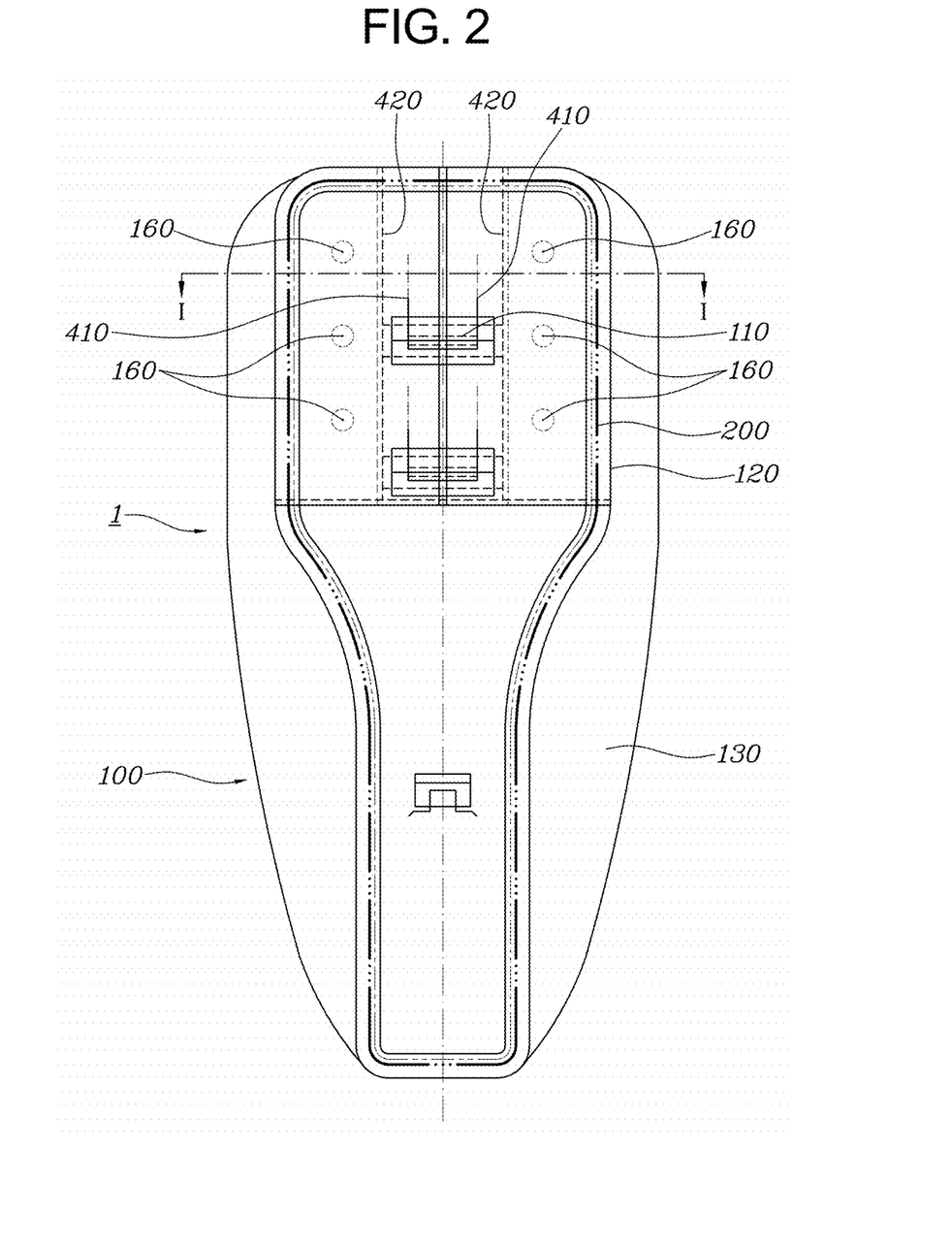
FIG. 2 is a front view showing the air bag cushion in FIG. 1 at a view from the front passenger seat.
Figure 3:
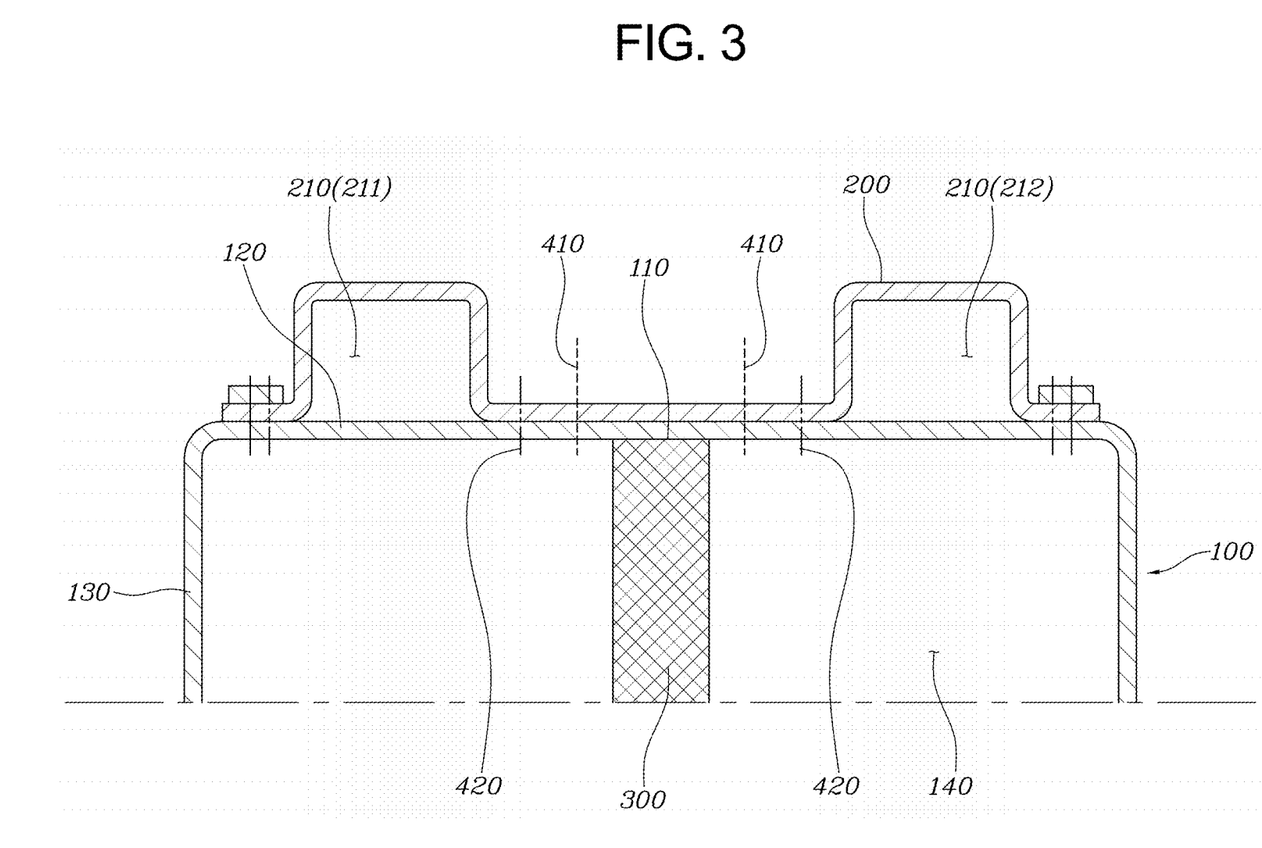
FIG. 3 is a sectional view taken from line I-I in FIG. 2.

In order to maintain the folded state of the tether reinforcing fabric 200, a first coupling portion 410 is provided to sew the front cushion part 120 and the folded tether reinforcing fabric 200 simultaneously, and the first coupling portion 410 is broken by inflation pressure of the tether reinforcing fabric 200 when the tether reinforcing fabric 200 folded as shown in FIG. 4 inflates by pressure of the air bag gas as shown in FIG. 3, and the tether reinforcing fabric 200 may efficiently inflate and be unfolded as the first coupling portion 410 is broken.

The first coupling portion 410 may provide the sewing with a weak coupling force.

Then, the tether reinforcing fabric 200 in the folded state as shown in FIG. 4 inflates by receiving pressure of the air bag gas as shown in FIG. 3, and after inflating, the auxiliary chamber 210 is formed between the tether reinforcing fabric 200 and the front cushion part 120, and the auxiliary chamber 210 includes a first auxiliary chamber 211 and a second auxiliary chamber 212 that are formed symmetrically left and right.

According to the embodiment of the present invention, in order to maintain the forms of the first auxiliary chamber 211 and the second auxiliary chamber 212, a second coupling portion 420 is provided to simultaneously sew the front cushion part 120 and the tether reinforcing fabric 200, so that the second coupling portion 420 maintains a coupled state between the front cushion part 120 and the tether reinforcing fabric 200 without being broken when the tether reinforcing fabric 200 inflates.

The second coupling portion 420 is located on a portion of each of the first auxiliary chamber 211 and the second auxiliary chamber 212, and may provide the sewing with a coupling force stronger than the coupling force of the first coupling portion 410.

The auxiliary chamber 210 formed when the tether reinforcing fabric 200 is unfolded includes the first auxiliary chamber 211 and the second auxiliary chamber 212 that are formed symmetrically left and right. Therefore, when the head of the front passenger is brought in contact with the auxiliary chamber 210 in a crash, the first auxiliary chamber 211 and the second auxiliary chamber 212 can support the front passenger's head to prevent the rotation of the front passenger's head.

As described above, the air bag cushion according to the embodiment of the present invention is configured such that the tether reinforcing fabric 200 coupled to the tether seam portion 110 of the main cushion 100 is used to allow the tether reinforcing fabric 200 to inflate with the main cushion when the main cushion 100 inflates and the auxiliary chamber 210 is formed between the main cushion 100 and the tether reinforcing fabric 200 by the inflating tether reinforcing fabric 200. In the event of a crash, the auxiliary chamber 210 of the tether reinforcing fabric 200 is used to support the head of the front passenger, and to prevent the rotation of the front passenger's head, so that the safety of the front passenger can be efficiently protected even in the event of a frontal offset crash.

The air bag cushion for a vehicle according to the present invention includes the auxiliary chamber 210 formed when the tether reinforcing fabric 200 is unfolded including the first auxiliary chamber 211 and the second auxiliary chamber 212 that are formed symmetrically left and right. Therefore, when the head of the front passenger is brought into contact with the auxiliary chamber 210 in a crash, the first auxiliary chamber 211 and the second auxiliary chamber 212 may support the head of the front passenger at the left and right of the front passenger, so that the movement of the head of the front passenger can be efficiently protected and the front passenger can be further safely protected in the event of a frontal offset crash.

Although the preferred embodiment of the present invention has been disclosed in detail only with respect to the above specific embodiments, those skilled in the art will appreciate that various modifications, additions, and substitutions are possible, without departing from the spirit and scope of the present invention, and it is appropriate that the various modifications, additions, and substitutions belong to the accompanying claims.

What is claimed is:

1. An air bag cushion for a vehicle, the air bag cushion comprising:
a main cushion configured to inflate by a pressure of air bag gas generated when an inflator is operated and to be unfolded toward a front passenger in a front passenger seat;
wherein the main cushion has a double panel structure comprising:
a front cushion part configured to face the front passenger while inflating, and
a rear cushion part connected to the front cushion part, extended toward a front portion of the vehicle, and coupled to the inflator;
a tether reinforcing fabric coupled to the main cushion to reinforce a tether seam portion of the main cushion, and being configured to inflate with the main cushion by receiving the air bag gas from the main cushion when the main cushion inflates, and being configured to provide an auxiliary chamber configured to prevent rotation of the front passenger's head when being brought into contact with the front passenger's head after inflating; and
a tether having a first end sewn on the tether seam portion of the front cushion part and a second end sewn on the rear cushion part, and configured to maintain an inflation state of a main chamber by a tension when the main cushion inflates.

2. The air bag cushion of claim 1, wherein the tether reinforcing fabric is coupled to a front surface of the main cushion, the front surface facing the front passenger, and is configured to be unfolded toward the front passenger while inflating.

3. The air bag cushion of claim 1, wherein the double panel structure of the main cushion comprises an upper edge line of the front cushion part sewn to an upper edge line of the rear cushion part, a lower edge line of the front cushion part sewn to a lower edge line of the rear cushion part, a left-upper edge line and a left-lower edge line of the rear cushion part sewn to each other, and a right-upper edge line sewn to a right-lower edge line of the rear cushion part.

4. The air bag cushion of claim 1, wherein the front cushion part and the rear cushion part are connected to each other along a curvature line.

5. The air bag cushion of claim 1, wherein a front surface of the front cushion part has a plurality of vent holes configured to transfer the air bag gas to the auxiliary chamber.

6. The air bag cushion of claim 1, wherein an edge line of the tether reinforcing fabric and an edge line of a front surface of the front cushion part are sewn together; and
before the tether reinforcing fabric inflates, the tether reinforcing fabric remains in a folded state in which the tether reinforcing fabric is in contact with a front surface of the front cushion part and is folded several times.

7. The air bag cushion of claim 6, further comprising:
a first coupling portion coupling the front cushion part to the folded tether reinforcing fabric to maintain the tether reinforcing fabric in the folded state,
wherein the first coupling portion is broken by an inflation pressure of the tether reinforcing fabric when the folded tether reinforcing fabric inflates by the pressure of the air bag gas.

8. The air bag cushion of claim 6, wherein the tether reinforcing fabric is configured to inflate by receiving the pressure of the air bag gas, and after inflation, the auxiliary chamber is provided between the front cushion part and the tether reinforcing fabric.

9. The air bag cushion of claim 8, wherein the auxiliary chamber comprises a first auxiliary chamber and a second auxiliary chamber, and
a second coupling portion is provided to couple the front cushion part and the tether reinforcing fabric to maintain forms of the first auxiliary chamber and the second auxiliary chamber,
wherein the second coupling portion continuously maintains a coupled state between the front cushion part and the tether reinforcing fabric without being broken when the tether reinforcing fabric inflates.

10. An air bag cushion for a vehicle, the air bag cushion comprising:
- a main cushion configured to inflate by a pressure of air bag gas generated when an inflator is operated and to be unfolded toward a front passenger in a front passenger seat;
- wherein the main cushion has a double panel structure comprising:
  - a front cushion part configured to face the front passenger while inflating, and
  - a rear cushion part connected to the front cushion part, extended toward a front portion of the vehicle, and coupled to the inflator; and
- a tether reinforcing fabric coupled to the main cushion to reinforce a tether seam portion of the main cushion, and being configured to inflate with the main cushion by receiving the air bag gas from the main cushion when the main cushion inflates, and being configured to provide an auxiliary chamber configured to prevent rotation of the front passenger's head when being brought into contact with the front passenger's head after inflating,
- wherein the front cushion part comprises the tether seam portion on which a first end of a tether is sewn, and
- the tether reinforcing fabric is coupled to a front surface of the front cushion part, the front surface facing the front passenger and including the tether seam portion.

* * * * *